United States Patent

[11] 3,562,529

[72] Inventors Nelson E. Engborg
Greenwich;
Robert Bowling Barnes, Stamford; Maggio
Charles Banca, Greenwich, Conn.

[21] Appl. No. 742,224
[22] Filed July 3, 1968
[45] Patented Feb. 9, 1971

[73] Assignee Barnes Engineering Company
Stamford, Conn.
a corporation of Delaware

[54] INFRARED THERMOGRAPH PRODUCING COLOR IMAGES BY SELECTIVE INSERTION OF COLOR FILTERS BETWEEN A SCANNING LIGHT SOURCE AND A LIGHT SENSITIVE SURFACE
10 Claims, 6 Drawing Figs.

[52] U.S. Cl. 250/83.3, 250/65
[51] Int. Cl. H01j 39/00
[50] Field of Search 250/65, 83.3IRI, 86

[56] References Cited
UNITED STATES PATENTS

| | | | |
|---|---|---|---|
| 2,895,049 | 7/1959 | Astheimer et al. | 250/83.3 |
| 3,303,508 | 2/1967 | Jaffe et al. | 250/71.5 |

*Primary Examiner*—James W. Lawrence
*Assistant Examiner*—C. E. Church
*Attorney*—Joseph Levinson and Robert Ames Norton

ABSTRACT: An infrared thermograph is provided which synchronously scans an infrared detector over a field of view and a constant brightness light over a light sensitive surface. The constant brightness light source is modulated by a filter means in accordance with signals developed by the infrared detector to produce a thermal image of the field of view of the thermograph on the light sensitive surface. A number of different visual displays, including color, are provided depending on the type of filters used.

INVENTOR
NELSON E. ENGBORG
ROBERT BOWLING BARNES
MAGGIO CHARLES BANCA
BY
ATTORNEY

INVENTOR
NELSON E. ENGBORG
ROBERT BOWLING BARNES
MAGGIO CHARLES BANCA
BY Joseph Levinson
ATTORNEY

INFRARED THERMOGRAPH PRODUCING COLOR IMAGES BY SELECTIVE INSERTION OF COLOR FILTERS BETWEEN A SCANNING LIGHT SOURCE AND A LIGHT SENSITIVE SURFACE

BACKGROUND OF THE INVENTION

The present invention relates to an infrared camera called a thermograph of the type generally disclosed and described in U.S. Pat. No. 2,895,049 entitled "Image Transducer" by R. W. Astheimer et al. Such an infrared thermograph is sensitive to infrared radiation and produces a thermal image of a scanned field of view. In the aforesaid patent an infrared detector is scanned over a field of view optically, and produces electrical signals in accordance with infrared radiance of objects in the scanned field of view of the thermograph. The signals from the infrared detector are amplified and processed, and applied to a glow modulator tube which is scanned over film synchronously with the scanning of the field of view to provide a recorded thermal image called a thermogram. The glow modulator tube is thus intensity modulated in accordance with the signals from the infrared detector to produce a black and white picture in which the grayness of the picture is a prescribed function of the infrared radiance of objects in the scanned field of view of the thermograph. Although the aforesaid system has proven quite satisfactory for a wide range of applications in the medical and industrial areas, certain problems exist with the use of the glow modulator tube and the intensity modulating of the brightness of such a tube. Perhaps the most readily apparent disadvantage would be the overdriving of the glow modulator tube, which could result in destroying the tube. Though less apparent, but more important are the changes in spectral characteristics which result when the glow modulator tube is driven at varying levels. These changing spectral characteristics of the glow modulator tube make it difficult to provide a light sensitive surface of film which provides the proper response in accordance with the radiation level desired to be measured and recorded. Although the problem has been somewhat alleviated with the proper compromise selection of glow modulator tubes and film in the black and white, the problem takes on added stature when trying to produce colored thermal images of the field of view.

It is often advantageous in thermography to provide the thermal image of the field of view of the thermograph in a variety of patterns. For example, in a continuous spectrum or an analogue presentation from black to white, it is sometimes difficult to distinguish areas on the thermograph which have nearly the same temperature. To provide such a showing in the system of the aforesaid patent, electronic means have been used in the form of a plurality of level setters so that distinct steps or levels of drive current are applied to the glow modulator tube which come out on the thermograph as plateaus having the same color. In a similar manner, electronic means have been provided to indicate isothermal lines by sending a spike of current when levels are shifted in the glow modulator tube drive current. These digital or step function thermograms, as well as the isothermal lines provided thereon, require extra electronic equipment and can suffer the disadvantage of a deteriorating glow tube at different drive levels. It would be desirable to provide a much simpler, more flexible means for deriving different forms of display.

Accordingly, it is an object of this invention to provide an improved thermograph which offers a wide variety of visual displays and overcomes some of the disadvantages associated with prior thermographs.

Another object of this invention is to provide an improved thermograph which provides a multiplicity of readily changeable displays without the necessity of adding extensive and complex structure.

SUMMARY OF THE INVENTION

In carrying out this invention in one illustrative embodiment thereof, a constant brightness light source is scanned over a light sensitive surface in synchronism with the scanning of an infrared detector over a field of view of a thermograph. A filter means having a plurality of different filter components modulates the beam of the constant light source before it strikes the light sensitive surface. The filter means is driven in accordance with signals from the infrared detector, thereby producing a thermal image of the field of view of the thermograph in a predetermined arrangement in accordance with the filter components of the filter means. A large variety of patterns are disclosed, which include continuous or analogue black and white as well as color, step function or digital color or black and white, step function or digital patterns with isotherms, a hot background for any of the aforesaid patterns, and a multiple choice of several of the aforesaid patterns.

DESCRIPTION OF THE PREFERRED EMBODIMENTS

Figure 1:
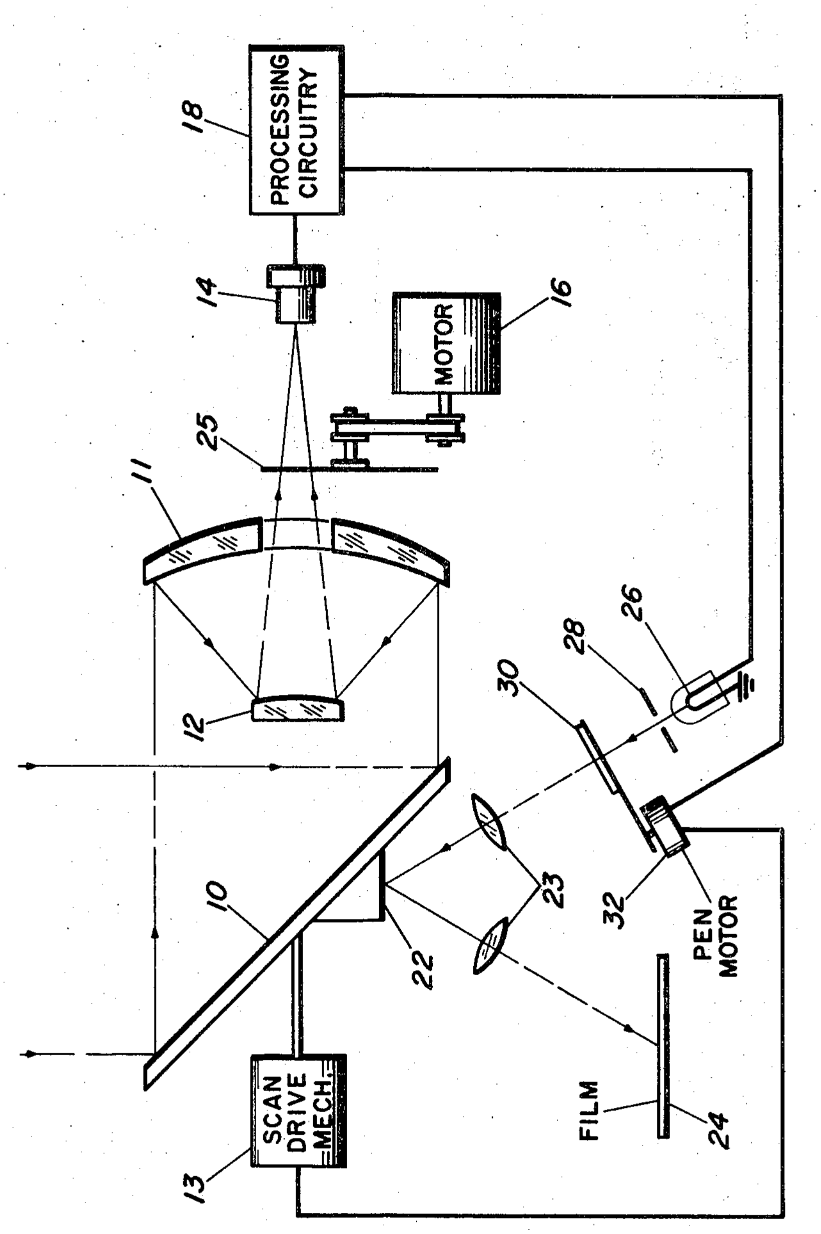
FIG. 1 is a schematic diagram of a thermograph in accordance with this invention.

Referring now to FIG. 1, an infrared thermograph is provided having a plane scanning mirror 10 which is driven by a scan drive mechanism 13. The plane scanning mirror 10 provides an X—Y scan of the field of view of the thermograph, and radiation reflected therefrom is collected and focused by a Cassegrain optical system including a primary element 11 and a secondary element 12 on an infrared detector 14. Interposed in the path of the radiation collected and focused by the optical system on the detector 14 is a chopper 25 driven by a motor 16. The chopper 25 has alternating sections which are opaque and transparent to the radiation applied to the detector. Accordingly the detector 14 measures the difference in the radiation applied thereto from the field of view and the radiation from the opaque section of the chopper blade. Electrical signals generated by the infrared detector 14 in accordance with the difference in radiation received, are amplified and synchronously detected in processing circuitry 18. All the aforesaid structure is similar to that set forth in the aforesaid patent, as well as in commercial thermographs manufactured by Barnes Engineering Company, Stamford, Conn.

The present invention departs dramatically from the old system in the manner and structure utilized in producing the thermogram or visual presentation of the thermal image of the field of view of the thermograph. In the present invention a bright light source 26 is energized from the power supply of the processing circuitry 18 to drive the light source 26 at a constant or steady brightness. Although no special light source is required, it is preferable that the light source 26 provide a full visible light spectrum, and an ordinary tungsten filament lamp is suitable for this purpose. An aperture 28 is provided over the light source 26 to provide a narrow beam of light from the source 26. The narrow beam of light from the source 26 is imaged through collimating lenses 23 on a light sensitive surface or film 24 by a reimaging mirror 22. The reimaging mirror 22 is conveniently attached to the scanning mirror 10. Accordingly as the plane scanning mirror 10 scans the field of view of the thermograph, the beam of light from the light source 26 is synchronously scanned across the film 24. In order to produce a thermal image of the field of view of the thermograph, the constant brightness light source 26 must have its beam of light modulated in accordance with the intensity of the radiation received on a point by point basis from its field of view. This is accomplished in the present invention using a filter means 30 which intercepts the light beam of the source 26 before it strikes the light sensitive surface of film 24. The filter means 30 is interposed in the system above the aperture 28 and is driven by a transducer 32 which in turn is driven by the electronic processing circuitry 18. The requirement of the transducer 32 is that it be able to provide small displacements of the filter means 30 in response to current from the processing circuitry 18 which, of course, is related to the intensity of radiation received by the detector 14 from the field of view of the thermograph. A commercially available integrated pen motor-amplifier taken from a standard paper recorder unit has been found suitable for this function. However, it will be apparent that other types of transducers may be utilized, for example a loud speaker voice coil, piezoelectric device, or others. As will be explained in more detail presently, the filter means 30 includes a plurality of different filter components which are arranged in predetermined patterns as desired. By moving the filter means 30 by the transducer 32 across the aperture 28 in front of the light source 26, the beam of light is modulated by passing different amounts or different colors of the spectrum in accordance with the plurality of filter components on the filter means 30. This in turn provides such a pattern on the film 24 to provide a thermal image of the field of view of the thermograph.

Figure 2:
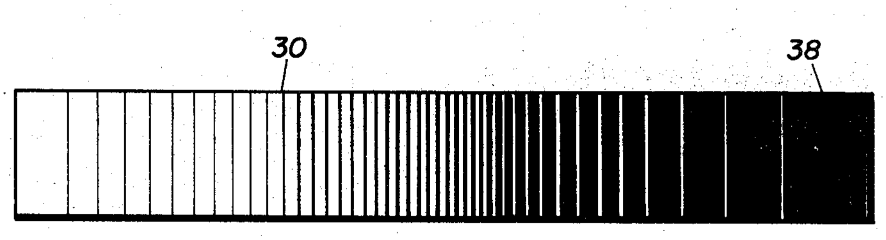
FIG. 2 illustrates a variable density black and white filter means which may be used in the thermograph shown in FIG. 1.

The beauty of the present system resides in the extreme flexibility of the system to provide a wide variety of visual presentations of the field of view of the thermograph in a very simple manner. FIGS. 2—6 which show a variety of filter arrangements are merely illustrative of this point. In FIG. 2 the filter means 30 is comprised of a variable density filter which is continuous from white to black, which would provide the type of thermograms available from the conventional system. In the variable density filter different amounts of the beam of light from the source 26 would be applied to the film in accordance with the transparency of a given section of the filter means. Even this arrangement provides an advantage over the old system in being able to eliminate the intensity modulation of a glow tube by using a constant brightness source, which would provide a more uniform picture. Also appearing on the filter means of FIG. 2 is an opaque section 38. The opaque section 38 is utilized for blanking during retrace intervals in the scanning after each line and frame. This is accomplished by energizing the transducer 32 from the scan drive mechanism 13 to bring the opaque section 38 of the filter 30 in front of the light source 26 during the retrace intervals, both horizontal and vertical. This is a very simple and convenient way to provide the blanking function which, in the aforesaid system, was accomplished by reducing the drive current on the source, which suffers the disadvantage of putting a great strain on the source. Although blanking in the manner just described is preferred, as an alternative thereto an opaque vane driven by the scanning mechanism could be utilized if desired, to be actuated in covering the light source 26 on the retrace intervals.

Figure 3:
FIG. 3 illustrates a continuous spectrum color filter means which may be used in the thermograph shown in FIG. 1.

FIG. 3 illustrates the use as filter means 30 of a continuous color spectrum from red to violet. With the use of this filter, conventional color film would be substituted for black and white film. In this case, thermograms are produced in color, in which the hot objects in the field of view appear red, and cold objects appear violet on the film.

Figure 4:
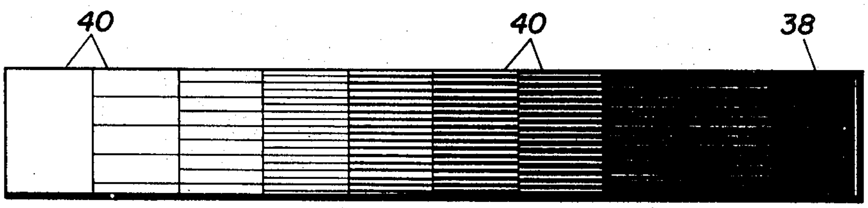
FIG. 4 illustrates a digital or step function filter means either in black and white or color which may be used in the thermograph of FIG. 1.

The continuous spectrum, either black and white or color, provides an analogue presentation of the thermal image of a field of view of the thermograph. Different types of visual presentation are simply provided in the present system. For example, FIG. 4 illustrates the step, or digital type of presentation, in which the filter is made up of distinct bands or step-function filters. FIG. 4 illustrates 10 such steps, which in black and white would be 10 shades of gray from black to clear, and in color would represent 10 different color filters. The thermogram produced therefrom, either in black and white or color, would represent 10 different temperatures from the field of view. The advantage of the digital thermogram is that all areas on the thermogram of the same temperature would be of the same color, making it easier to distinguish changes in temperature. It will be apparent that fewer steps may be used than are shown if only larger temperature changes are desired to be observed. It would also be apparent that, if desired, the temperature values could readily be reversed by merely reversing the order of the filters. Thus hot would become violet or black, while cold objects in the field of view would be depicted as red or white. With respect to black and white presentations, greater temperature separations could be provided on the white end of the filter with smaller percentage changes on the black end to provide a sort of logarithmic filter. This would be of value because the eye is more susceptible to changes in black and less perceptive to changes in white. By making the steps greater on the white end, the thermograms become easier to read.

Figure 5:
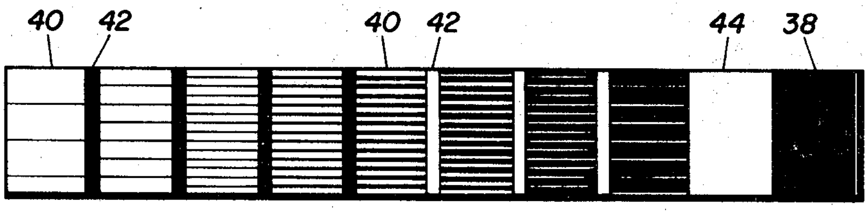
FIG. 5 illustrates a step function or digital-type filter means including isotherms, and also illustrates the use of a hot background for the thermograph of FIG. 1.

FIG. 5 illustrates a different form of the digital presentation illustrated in FIG. 4 in that the digital step filters 40 are separated by clear or transparent or opaque areas 42 between steps. The resulting thermogram, whether black and white or colored, and whether analogue or digital, would contain the equivalent of isothermal white or black lines, depending on whether transparent or opaque areas 42 are used. Thus, areas of different temperature would be outlined by white or black lines, making it easy to differentiate areas of different temperatures. Also, once the temperature change is known from one filter element to another, the temperature differences of the isothermal lines could be determined. There is no requirement that the isotherms separate each filter element, so that any combination or predetermined arrangement for black or white isotherms may be used. FIG. 5 also illustrates a clear or transparent section 44 next to the opaque blanking section 38. Again, either in the case of black and white or colored thermograms, the normally cold background associated with the subject being thermographed could be photographed as pure white by putting the clear filter 44 just below the "keep alive" or the coldest (violet or black) part of the filter 30. Such a simulated hot background is highly desirable in order that very cold objects such as hair, gangrenous toes, and cold extremities which are present in medical thermography could be silhouetted against a white background. In present thermograms, may of these extremities are cold and blend into the background such that they are hardly distinguishable in the thermogram. In providing the digital presentations, the one requirement that is necessary is that the filter component of the filter means be at least as wide as the light beam from the source 26 coming out of the aperture 28. A 0.02 inches aperture has been found to be satisfactory, but other sizes may be utilized. The positioning of the filter means 30 should be close to the aperture, since the light beam is diverging as it comes out of the aperture. However, this spacing has not been found to be critical, and it will depend on the aperture size and the optical design of the system.

The filter means 30 may be of any suitable form. The length as well as size will depend on the drive capability of the modulating transducer 32. One form of filter means which has been found suitable is made merely by printing the variable density or color spectrums directly on film and utilizing the exposed film as filter means. Such a filter has worked satisfactorily for scanning a line in three-fourths sec., which provides a 90-line picture in 1½ min. and a 180-line picture of the same field of view in approximately 3 minutes.

Figure 6:
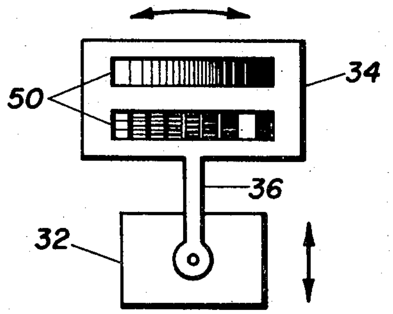
FIG. 6 illustrates a multiple choice-type filter means and a drive mechanism for the filter means suitable for use in the thermograph of FIG. 1.

FIG. 6 illustrates the further flexibility of the system by providing a multiple choice of filter patterns. The pen motor 32 drives an arm 36 which has a vane 34 mounted thereon, carrying a plurality of different filter patterns 50. By merely shifting vertically either the entire pen motor assembly or the filter patterns in the vane, a choice of data presentations is readily made available without the necessity of removing patterns from the vane and inserting new ones.

An improved thermograph system is thus provided by replacing a modulated glow tube with a constant brightness source and modulating the constant brightness source with a plurality of filter means. The elimination of the glow tube provides a more consistent visual presentation whose results are not dependent on the vagaries of a varying source with its inherent spectral problems. A much more flexible system is provided, in which different types of visual presentation, including a color presentation, are provided without complexity. Color presentations, which were not available with the aforesaid system, are made available. The digitized or step-type presentations, which were available before only with elaborate electronic equipment, are now available merely by the selection of a filter.

I claim:

1. An infrared thermograph for producing visual presentations in accordance with infrared radiation received from the field of view of the thermograph comprising in combination:

a. an infrared detector responsive "to the intensity of incident radiation"

b. optical means including a scanning means for scanning, collecting and focusing infrared radiation from a predetermined field of view onto said infrared detector which produces signals in accordance with the infrared radiation received from said field of view;

c. a continuously illuminated constant brightness light source;

d. a small aperture positioned above said light source for producing a constant, defined beam of light therefrom;

e. a light sensitive surface;

f. means for moving said beam of light from said light source in synchronism with said scanning means whereby said beam of light is scanned across said light sensitive surface synchronously with the scanning of the field of view of the thermograph;

g. filter means having a plurality of different filter components in a predetermined arrangement positioned to intercept said beam of light, before said beam strikes said surface; and h. transducer means for adjusting said filter means in accordance with signals from said infrared detector whereby said beam of light is modulated by said filter means as it moves across said light sensitive surface to produce a thermal image of the field of view of said thermograph.

2. The infrared thermograph set forth in claim 1 wherein the plurality of filter components of said filter means comprise a continuous spectrum filter.

3. The infrared thermograph set forth in claim 1 wherein said filter means includes an opaque section on one extremity thereof, said opaque section being positioned over said aperture when said transducer is actuated by said scanning means during retrace intervals of a scan cycle.

4. The infrared thermograph set forth in claim 1 wherein said filter means includes a transparent section positioned next to a filter component which represents the coldest color of the plurality of different filter components for providing a hot background on said light sensitive surface.

5. The infrared thermograph set forth in claim 1 wherein the plurality of filter components of said filter means comprise discrete bands.

6. The infrared thermograph set forth in claim 5 wherein at least two of said discrete bands are separated by transparent sections.

7. The infrared thermograph set forth in claim 5 wherein at least two of said discrete bands are separated by opaque sections.

8. An infrared thermograph for producing visual presentations in accordance with infrared radiation received from the field of view of the thermograph comprising in combination:

a. an infrared detector;

b. means including said infrared detector for scanning a predetermined field of view to produce signals in accordance with the intensity of infrared radiation received from said field of view;

c. a continuously illuminated constant brightness light source;

d. filter means having a plurality of different filter elements in a predetermined arrangement including an opaque section on one extremity thereof positioned to intercept said light source;

e. means for scanning said light source over a light sensitive surface in synchronism with the scanning of the field of view of the thermograph;

f. means including said filter means for modulating said constant brightness light source in accordance with signals from said infrared detector in which said opaque section is positioned to block said light source during retrace intervals in the scanning of said field of view.

9. The infrared thermograph set forth in claim 8 wherein said filter means includes a transparent section positioned next to a filter component which represents the coldest presentation of the plurality of different filter components for providing a hot background on said light sensitive surface.

10. The infrared thermograph set forth in claim 8 wherein said filter means includes a plurality of discrete bands at least two of which are separated by transparent sections.